Patented May 7, 1935

2,000,601

UNITED STATES PATENT OFFICE 2,000,601

PRECIPITATION OF CELLULOSE ESTERS

Carl J. Malm and Charles R. Fordyce, Rochester, N. Y., assignors to Eastman Kodak Company, Rochester, N. Y., a corporation of New York No Drawing. Application July 28, 1931, Serial No. 553,646

9 Claims. (Cl. 260—102)

This invention relates to the precipitation and washing of higher fatty acid esters or mixed esters of cellulose from their reaction baths by employing the ethers of the higher alcohols such as isopropyl ether and to the use of such ethers as a precipitant for cellulose organic esters in general.

Heretofore the precipitants employed for the precipitation or separation of the higher fatty acid esters of cellulose from the reaction bath thereof have been either methyl alcohol or ethyl ether. As the reaction bath contains fatty acids and sulfuric acid obviously the employment of methyl alcohol will result in the formation of esters. For instance if acetic acid is present in the bath, methyl acetate is formed. This ester formation results not only in a waste of methyl alcohol and acetic acid, and the introduction of an impurity in the form of methyl acetate but, as many of the cellulose esters containing higher fatty acid groups are soluble in methyl acetate, it leads to waste of the cellulose esters themselves.

Ethyl ether has been found to have the desired characteristics of (1) a solvent for all the components of the acylation reaction mass except the cellulose esters, and (2) is inert toward all the components of the reaction mass. However, when ethyl ether is used for the precipitation and washing of the cellulose esters there is the decided disadvantage, due to the volatility of this ether, of its substantial loss by evaporation. The loss of ethyl ether by evaporation is considerable when the commercial process is carried out at ordinary temperatures even under the most favorable conditions.

It is also to be recognized that both of these precipitants previously employed have a definite detrimental physiological effect on the human system. As is well known methyl alcohol has a decidedly injurious effect on the eyes and ether when absorbed by the system has a narcotic effect directly proportional to the amount absorbed. If the loss of the ether with its accompanying danger is to be avoided either a low temperature of operation is necessary or an equivalent liquid which has substantially all of the desirable properties of the ethyl ether but with a lower vapor pressure, must be used.

We have found that the ethers of the higher alcohols such as iso and normal propyl ether or the butyl or amyl ethers, etc., possess the advantages of ethyl ether referred to, without possessing the disadvantage of loss by evaporation with its accompanying injury. We have found that the cellulose organic esters precipitated from their anhydrous reaction masses by means of our ethers are transparent or colloidized as distinguished from the opaque form in which the esters of cellulose are usually obtained. This obviously eliminates the necessity of redissolving the cellulose esters again to produce colloidized cellulose ester material such for instance as films, filaments, etc.

Our process comprises the precipitation of a cellulose organic ester from a reaction mass which contains the cellulose ester and the various reagents which have not been consumed in the acylation step, by pouring or extruding the reaction mass into an ether of a higher alcohol and filtering the precipitate formed off from the liquid. The separation of the liquid from the precipitate may be accomplished in any well known manner such as filter pressing, screening or centrifuging. After the cellulose ester has been separated it may be washed with a higher ether by any well known washing or extraction process such as by countercurrent washing, or by a continuous washing and draining process. The continuous washing or extraction process may be carried out by spraying the ether onto the cellulose ester, and conveying the ether from the ester to a chamber where the ether is separated by evaporation from the impurities extracted from the cellulose ester. By condensing the ether vapors and allowing the condensed ether to fall on the cellulose ester material the washing process may be made continuous.

The following examples are given as illustrative of the carrying out of our invention in the precipitation of the ester from its reaction mixture.

A dope of cellulose acetate containing acetic acid, catalyst and cellulose acetate of 38% acetyl content, resulting from the hydrolysis step of an acetylation process was precipitated by pouring into an excess of iso-propyl ether. The precipitate was filtered off and was purified by extraction or washing with iso-propyl ether.

A dope of cellulose acetate-stearate containing ethoxy acetic acid (which results from the ethoxy acetic anhydride in the acylation step) stearic acid and cellulose acetate-stearate of 38% stearyl content was diluted with 50% of its volume of iso-propyl ether and was then precipitated by pouring into an excess of iso-propyl ether. The precipitate was then filtered off and was purified by extraction or washing with isopropyl ether. Due to the amount of solvent in the reaction mass, the 50% of iso-propyl ether added initially does not precipitate the cellulose ester in solution but when the entire mass is poured into an excess of the ether, precipitation occurs. Precipitation may be accomplished by pouring the reaction mixture directly into the ether, although a somewhat fluffier, more open product is obtained by adding some of the ether to the reaction mixture.

Instead of employing the ether of higher alcohol alone as a precipitant a mixture of the ether and a solvent for the cellulose ester may be employed as a precipitating bath. In this case it is preferred to use as the solvent of the precipitation mixture, the same solvent employed in the esterification. For instance if an organic acid such as acetic has been used as a solvent in the esterification, it is preferred to employ an acetic acid (or some other organic acid) - ether mixture as the precipitant. If ethylene chloride has been employed as a solvent, it would be preferred to employ it as one of the constituents of the precipitating bath. This solvent-ether type of precipitant is applicable to the precipitation of the esters of cellulose in general, both simple and mixed. However, with the esters containing higher radicals, the solubility increases as the radicals increase in length, consequently the concentration of the solvent present should be decreased. Also increase in solubility results in esters with decreased acyl content so that a lesser proportion of solvent to ether should be employed, the more the ester is hydrolyzed. For example an acetic acid solution of cellulose acetate of 40% acetyl content can be precipitated in iso-propyl ether containing 50-55% of acetic acid. If the cellulose acetate has been hydrolyzed down to a 38% acetyl content, the concentration of acetic acid in the ether should be 40-45% in order to obtain optimum results.

A solution of cellulose acetate (40% acetyl) in 4 parts of ethylene chloride to 1 part of acetic acid can be precipitated in the ether containing 45-50% of ethylene chloride. A cellulose diacetate-monopropionate in solution in a 50—50 mixture of acetic and propionic acids precipitates with the best results in the ether which contains 20-25% of the mixed acid.

As was pointed out above, the cellulose organic ester precipitate obtained by employing the ethers of the higher alcohols is transparent and brilliant in contrast to the dullness and the opaqueness of the precipitated cellulose organic ester ordinarily obtained. We have found that our invention may also be employed for the coating of film or the spinning of filaments of cellulose esters direct from the original esterifying bath without the necessity of precipitating and redissolving the cellulose ester before film or filament formation. For instance, in the above example if filaments are desired the solution which has been diluted with iso-propyl ether may be extruded through an orifice into the iso-propyl ether precipitating bath. These filaments are suitable for artificial silk and the like. Also the above referred to solution, diluted with iso-propyl ether may be allowed to run on to rolls in an iso-propyl ether bath to form cellulose derivative sheeting or film. As this filament and film formation takes place directly from the reaction bath, considerable saving in steps and time results.

If desired the cellulose ester of the reaction mass may be precipitated and washed, preferably with an ether of a higher alcohol, and then redissolved in a solvent such for example as ethylene chloride or propylene chloride. This solution may be reprecipitated by means of the higher-alcohol-ether, to form filaments, fibers or sheets or by other methods well known in the art. The product formed by a second precipitation is obviously more highly purified and more free of defects than the product precipitated directly from the reaction mass. In cases where purity of the product is of importance and economy is a secondary consideration, the reprecipitation procedure described above is preferred.

It is to be understood, that in the examples given herein where iso-propyl ether is employed, the ethers of the higher alcohols both simple and mixed may be employed as precipitants in a similar manner. For instance, n-propyl ether or the ethers of the various butyl and amyl alcohols may be employed as precipitants and washing agents as well as various mixed ethers containing at least one higher alcohol group such as, methyl-tert butyl ether, ethyl-tert-butyl ether, isopropyl-tert butyl ether, methyl-tert amyl ether, etc.

We have found that by employing our precipitant, cellulose esters can be caused to adhere strongly to various surfaces when applied directly to the surface from a solution containing a solvent having a lower boiling point than the precipitant. This feature may be utilized for example in the coating of glass such as bottles or for laminating glass sheets. A bottle may be dipped into the solution, preferably after diluting for example with isopropyl ether. The bottle with the adhering cellulose ester solution may then be dipped into isopropyl ether and a solid, transparent, strongly adherent coating of cellulose ester is formed in the bottle. Also if desired part of the low boiling solvent may be driven off thus eliminating the necessity of dipping into isopropyl ether. Thus the bottle is strengthened and rendered shatterproof.

Shatterproof or laminated glass sheeting may be made for example by precipitating a layer of cellulose ester on a glass sheet in accordance with our invention and pressing it together with another glass sheet. If desired heat may also be employed during the pressing operation.

Although this invention has been described as a method for separating certain simple or mixed esters of cellulose containing groups from the fatty acids higher than acetic from their solutions nevertheless our precipitation method may be employed to separate any organic ester of cellulose from its reaction bath such as cellulose nitrate-acetate, cellulose nitrate-acetate propionate etc. As water is commonly employed as the precipitant of cellulose acetate from its reaction baths, our process will find its greatest application (so far as producing the ester is concerned) in the separation of the higher esters, such as, cellulose propionates, butyrates, acetate-propionates, acetate-stearates, acetate butyrates, acetate-stearate-palmitates, etc., from the baths in which they have been produced such as described in Clarke & Malm U. S. Patent 1,800,860.

Other applications of our process will occur to those skilled in the art as there are numerous instances where transparent or colloidized cellulose esters are useful and the adaptation of our process to those instances is contemplated by our invention.

For instance our process may be employed for the preparation of molding powders by dissolving a particular organic ester of cellulose in a suitable solvent such as acetone or ethylene dichloride and precipitating the ester by means of iso-propyl ether preferably accompanied by high speed stirring after which the liquid mixture is filtered or evaporated off. If desired the solution may be diluted with the iso-propyl ether before the ester is actually precipitated. It is definitely known for instance that if iso-propyl ether is added to an acetone solution of cellulose acetate propionate a finely divided precipitate of the ester will be thrown down. On the other hand if iso-propyl ether is added to an acetone solution of cellulose acetate stearate, a mere jelling without precipitation takes place. (While a gel is not frequently desired in the industry, it may be prepared in this manner). However, cellulose acetate stearate may be precipitated from an acetone solution by pouring the solution into iso-propyl ether with stirring. The various organic esters of cellulose which may be precipitated by either of these methods are (once the method is known) merely a matter of experiment and will be apparent to those skilled in the art, as the need for the precipitation of any particular organic ester of cellulose arises. From the foregoing one will observe that it is better to precipitate the lower esters by adding the ether to the acetone solution and the higher esters by adding the solution to the ether. This general method of forming molding powders is disclosed in Crane and Northrup application Ser. No. 551,508 in which those applicants produce molding powders by precipitating the cellulose ester from its solution into a nonaqueous precipitant. Due to the unusual properties of the cellulose ester precipitated by means of iso-propyl ether, molding powders may even be prepared from the reaction mixture in which the cellulose ester is present by our process of precipitation by following the teachings of the instant application.

It is to be understood that the term "higher alcohols" refers to the alcohols having more carbon atoms than ethyl alcohol. As pointed out by the examples given, the higher alcohols preferred are the simple, monohydroxy, aliphatic alcohols especially the alcohols belonging to the homologous series beginning with methyl alcohol which will be referred to herein as the alkyl alcohols.

What we claim as our invention is:

1. A process of separating an acetyl-containing fatty acid ester of cellulose from the solvent in which it is dissolved which comprises introducing that solution into a precipitating bath comprising acetic acid and an ether containing an alkyl radical having from 3 to 5 carbon atoms inclusive.

2. A process of separating an acetyl-containing fatty acid ester of cellulose from the reaction mass in which it was prepared which comprises introducing that mass into a precipitating bath comprising acetic acid and an ether containing an alkyl radical having from 3 to 5 carbon atoms inclusive.

3. A process of separating an acetyl-containing fatty acid ester of cellulose from the reaction mass in which it was prepared which comprises adding thereto an ether containing an alkyl radical of 3 to 5 carbon atoms in an amount insufficient to precipitate the ester and then introducing the solution into a precipitating bath comprising an excess of an ether containing an alkyl radical having from 3 to 5 carbon atoms inclusive.

4. A process of separating a mixed carboxylic acid ester of cellulose from the solvent in which it is dissolved which comprises adding thereto an ether containing an alkyl radical having from 3-5 carbon atoms in an amount insufficient to precipitate the ester and then introducing the solution into a precipitating bath comprising an excess of an ether containing an alkyl radical having from 3-5 carbon atoms.

5. A process of separating a carboxylic acid ester of cellulose containing acyl groups of 2-4 carbon atoms from the solvent in which it is dissolved which comprises precipitating the cellulose ester from its solution by introducing that solution into a precipitating bath comprising a lower fatty acid and an ether containing an alkyl radical of 3-5 carbon atoms.

6. A process of separating a carboxylic acid ester of cellulose containing acyl groups of 2-4 carbon atoms from the solvent in which it is dissolved which comprises precipitating the cellulose ester from its solution by introducing that solution into a precipitating bath comprising acetic acid and an ether containing an alkyl radical of 3-5 carbon atoms.

7. A process of separating a carboxylic acid ester of cellulose containing acyl groups of 2-4 carbon atoms from the solvent in which it is dissolved which comprises precipitating the cellulose ester from its solution by introducing that solution into a precipitating bath comprising a lower fatty acid and isopropyl ether.

8. A process of separating a carboxylic acid ester of cellulose containing acyl groups of 2-4 carbon atoms from the solvent in which it is dissolved which comprises precipitating the cellulose ester from its solution by introducing that solution into a precipitating bath comprising acetic acid and isopropyl ether.

9. A process of separating a carboxylic acid ester of cellulose containing acyl groups of 2-4 carbon atoms from the solvent in which it is dissolved which comprises adding thereto an ether, containing an alkyl radical of 3-5 carbon atoms, in an amount insufficient to precipitate the ester and then introducing the solution into a precipitating bath comprising an ether containing an alkyl radical of 3-5 carbon atoms.

CARL J. MALM.
CHARLES R. FORDYCE.